(12) United States Patent
Feldner

(10) Patent No.: US 7,641,396 B2
(45) Date of Patent: Jan. 5, 2010

(54) CONNECTION DEVICE WITH A CABLE GLAND HAVING HOUSING PARTS ENABLING RELATIVE MOVEMENT THEREBETWEEN

(75) Inventor: Ralf Feldner, Detmold (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 127 days.

(21) Appl. No.: 12/035,483

(22) Filed: Feb. 22, 2008

(65) Prior Publication Data
US 2009/0003777 A1 Jan. 1, 2009

Related U.S. Application Data

(62) Division of application No. 11/539,420, filed on Oct. 6, 2006, now Pat. No. 7,357,579.

(30) Foreign Application Priority Data
Oct. 10, 2005 (DE) .................. 10 2005 048 755
Jan. 2, 2006 (DE) .................. 10 2006 000 702

(51) Int. Cl.
  *G02B 6/38* (2006.01)
(52) U.S. Cl. ...................... 385/56; 439/462
(58) Field of Classification Search ............ 385/53–56, 385/70–71, 76–78, 88–89, 92, 94, 139; 439/461–462, 439/587, 589, 274, 257, 358, 905
See application file for complete search history.

(56) References Cited

U.S. PATENT DOCUMENTS

| 4,250,348 | A | | 2/1981 | Kitagawa |
| 5,159,652 | A | | 10/1992 | D'Alphonse et al. |
| 5,734,558 | A | * | 3/1998 | Poplawski et al. .......... 361/752 |

FOREIGN PATENT DOCUMENTS

WO    03/075045 A2    9/2003

OTHER PUBLICATIONS

Phoenix Contact Neuheiten Katalog 2004, p. 152, See Specification Paragraph [0007].

* cited by examiner

*Primary Examiner*—Javaid Nasri
(74) *Attorney, Agent, or Firm*—David S. Safran; Roberts Mlotkowski Safran & Cole, P.C.

(57) ABSTRACT

A connection device for connecting an optical fiber to an electrical device has a housing, a cable gland, and a plug for insertion into the corresponding socket of the electrical device, the housing having a cable passage for insertion of the optical fiber, the plug being held at least partially in the housing and being connectable to the fibers of the optical fiber which has been inserted into the cable passage. The housing has a first housing part for holding the plug and a second housing part for connection to the cable gland. The first and second housing parts are connectable in a manner enabling them to be axially moved relative to each other in the connected state by an extent defined by at least one stop on the second housing part that is engageable with at least one opposing stop on the first housing part.

12 Claims, 9 Drawing Sheets

CONNECTION DEVICE WITH A CABLE GLAND HAVING HOUSING PARTS ENABLING RELATIVE MOVEMENT THEREBETWEEN

CROSS REFERENCE TO RELATED APPLICATION

This application is a division of commonly owned, U.S. patent application Ser. No. 11/539,420, filed Oct. 6, 2006, now U.S. Pat. No. 7,357,579.

BACKGROUND OF THE INVENTION

1. Field of the Invention

The invention relates to a connection device for connecting a cable, especially an optical fiber, to an electrical device, with a housing, a cable gland, and a plug for insertion into the corresponding socket of the electrical device, the housing having a cable passage for insertion and routing of the cable, the plug being held at least partially in the housing, and being connectable to the fibers or cores of the cable which has been inserted into the cable passage.

2. Description of Related Art

Connection devices for connecting a cable to an electrical device, especially to a communications means, for example, a computer, a notebook or a telephone, are known from practice. The cable is easily connected to the electrical device by the cable being connected to a plug and this plug being inserted into a corresponding socket on the electrical device. In order to simplify connection of the cable to the electrical device, it is conventional for at least one end of the cable to be already connected to a plug.

Known connection devices for electrical cable consist on a standard basis of a cable-side, eight-pin plug which is known in practice as a RJ-45 plug or a Western plug and a corresponding device-side connecting socket. The plug is generally connected to the cable in crimp connecting technology, but can also be soldered to it. The plug is generally fixed by means of a catch arm when inserted into the socket, but can also be held by a fastening hook which is present on the socket or on the electrical device or can be screwed to the electrical device by means of screws.

In addition, there are also connection devices for optical cables, i.e., for optical fibers. An optical fiber is an optical component which is suitable for transport of light and which often formed of a host of individual glass fibers or plastic fibers, especially polymer fibers, which are very thin relative to their length and which are combined into bundles; an optical fiber will however also be defined below as one with an individual fiber. The individual glass fibers or plastic fibers are generally surrounded by a plastic jacket. Larger amounts of data can be transmitted in the same time or the same amounts of data in a shorter time than with conventional coaxial cables due to the carrier frequency of the light which is much higher compared to electrical signals. Moreover, for optical fibers, there are no EMC problems. Compared to glass fibers, a polymer fiber has much higher attenuation values and a large diameter, but it is economical and easier to install.

Based on the development of both transmitting and receiving means and also optical fibers, the losses in transmission of signals over optical fibers are being continually reduced. Thus, the use of optical fibers for transmission of signals has increased greatly in recent years. Therefore, there is an increasing demand for connection devices for optical fibers which can be quickly connected and which are easy to handle (fiber-optic plugs).

For the connection hardware of optical fibers, there is a host of standardized plug connections which are not compatible among one another. The most common standard fiber-optic plugs are ST plugs, PC/FC lugs and SC plugs, the latter becoming increasingly popular. The SC plug (IEC 874-19) is a fiber-optic plug which is characterized as a polarized push-pull plug by its small dimensions and high packing density. This plug has a square design and can be used for multimode fibers and monomode fibers. Simplex, duplex and multiple links can be set up with the plug. Due to its structure, the plug is locked and has automatic interlocking with the corresponding socket. To release such a fiber-optic plug from the corresponding socket, it is necessary to pull the plug housing axially away from the socket by a short path of roughly 1 to 2 mm. In this way, the desired relative displacement of the outer plug housing occurs relative to the inner housing which holds the ferrules, by which the mechanical locking between the inner housing of the plug and the corresponding socket is released.

However, the disadvantage here is that the known standard fiber-optic plugs can only be used very conditionally in a rough industrial environment. Therefore, housings have been developed which hold the standard fiber-optic plugs and protect them against mechanical stresses and against dirt and moisture. For this purpose, the known connection device (see, "Phoenix Contact NEUHEITEN Katalog 2004", page 152) in addition to the housing which holds the actual plug, has especially a cable gland for sealing the cable to be protected. However, the problem in the known connection device is that the desired safe and strong holding of the plug and of the optical fiber to be connected in the housing, especially the fixing of the optical fiber which is necessary for sealing by means of the cable gland, hinders the axial movement capacity of the plug housing which is necessary for unlocking the plug.

SUMMARY OF THE INVENTION

A primary object of this invention is therefore to provide a connection device of the initially described type which enables both reliable mechanical protection of the plug and of the cable to be connected, and also provides a simple mounting and dismounting capacity of the plug with a corresponding socket.

This object is achieved in the initially described connection device according to a first teaching of the invention in that the housing is made in two parts, specifically a first housing part for holding the plug and a second housing part for connection to the cable gland which has a union nut, that the end of the first housing part assigned to the second housing part has a connecting area which is made such that the first housing part can be connected to the second housing part and can be axially moved in the connected state, on the second housing part there being at least one stop and on the first housing part at least one opposing stop so that the second housing part and the first housing part can be moved axially relative to one another by a defined path.

According to a second, alternative teaching of the invention, the aforementioned object is achieved in that the cable gland is made in two parts, specifically a sleeve-shaped part with an outer thread and a union nut with a corresponding inside thread which can be screwed onto the sleeve-shaped part, that the end of the housing assigned to the cable gland has a connecting area which is made such that the sleeve-shaped part can be connected to a connecting area, and that, in the connected state, the housing and the sleeve-shaped part can be moved axially relative to one another, a stop being provided in the sleeve-shaped part of the cable gland and at least one opposing stop being provided on the connecting area of the housing in a manner such that the housing and the sleeve-shaped part can be moved axially relative to one another by a defined path.

Even if the connection device of the invention is especially suited for connecting an optical fiber, it can also be used to connect an electrical cable. In addition to the problem which is described above in conjunction with the known fiber-optic plugs, applications can also be imagined in which the plug requires catch play to connect an electrical cable, on the one hand, for mounting or dismounting with the plug being tension-relieved and thus axially fixed for mechanical protection and sealing, on the other hand.

It is common to the two aforementioned alternative approaches of this invention that, between the housing or first housing part which holds the plug and the union nut which seals and axially fixes the cable, there is an additional component which enables axial displacement of the housing and the first housing part relative to the union nut which fixes and seals the cable, and thus, relative to the cable. Making the stop on the second housing part and on the sleeve-shaped part of the cable gland and an opposing stop on the first housing part or on the connecting area of the housing ensure that axial mobility is limited to a given length. In this way, both damage to the plug and the cable which is connected to the plug as well as unwanted dismounting of the connection device are prevented.

According to a first preferred configuration of the first teaching of the invention, in the connecting area of the first housing part, there is at least one window and on the side of the second housing part assigned to the first housing part, there is at least one catch arm with a projection, the projection of the catch arm in the connected state of the first housing part and the second housing part engaging a window. In this configuration, thus, the maximum displacement path of the first housing part relative to the second housing part is determined by the dimensions of the window and of the catch arm or of the projection. Moreover, the execution of the catch arm and of the window in the mounted state of the first housing part to the second housing part results in locking of the two housing parts against one another.

Preferably, the projection on the catch arm has an entry bevel and a step or edge. The entry bevel facilitates the mounting or mating of the two housing parts. To limit the axial movability of the first housing part in two directions there is also a second stop on the first housing part. In the first position of the first housing part, then, the first edge of the window adjoins the step of the projection, while in the second, axially shifted position of the first housing part, the free end of the catch arm strikes the second stop. The second housing part with the step of the projection and the free end of the catch arm likewise has two stops, like the first housing part with the first edge of the window and with the second stop has two opposing stops.

In one alternative configuration, in the connecting area of the first housing part, instead of a window, a saddle is formed through which the catch arm of the second housing part extends in the mounted state of the two housing parts. Here, the catch arm, as described above, has a projection with an entry bevel and a step, at this point, a second stop being formed for bilateral limitation of the axial mobility on the second housing part. In the first position of the first housing part, then, the edge of the saddle facing away from the second housing part adjoins the step of the projection, while in the second position of the first housing part, the front of the first housing part facing the second housing part adjoins the second stop. In this embodiment, the maximum possible axial displacement path is determined by the length of the catch arm and especially by the distance between the step of the projection and the second stop and by the position and width of the saddle.

To ensure the desired tightness of the two-part housing, advantageously, on the side of the second housing part assigned to the first housing part, a cylindrical extension is formed which extends into the first housing part in the mounted state of the two housing parts. In this connection, the end of the extension and the window which has been formed in the first housing part completely overlap, so that there is no open cutout to the cable space. The tightness of the two-part housing can be further improved in that in the area of the extension of the second housing part there is a corresponding seal element. The seal element is made and arranged such that it does not prevent, at most does not noticeably prevent, axial displacement between the first housing part and the second housing part.

In the connection device according to the second teaching of the invention, the axial movement capacity between the housing and the sleeve-shaped part of the cable gland is preferably accomplished in that at least one recess is formed in the sleeve-shaped part of the cable gland, and at least one corresponding projection is formed on the connecting area of the housing, in the connected state of the housing, the projection and the sleeve-shaped part engaging the recess and being able to move axially by a defined path in it.

In this case, the projection on the connecting area of the housing preferably has an entry bevel and a step so that the entry bevel facilitates installation of the housing and the sleeve-shaped part of the cable gland and the step forms an exact opposing stop. In the first position of the housing, then, the step of the projection adjoins the first edge of the recess while in the second, axially shifted position of the housing the front of the connecting area strikes the opposing edge of the recess. The maximum possible displacement path can thus also be easily set by the dimensions of the recess and of the projection.

As in the first teaching of the invention, in the second teaching of the invention the seal between the housing and the cable gland, especially the first part of the cable gland, i.e., the sleeve-shaped part, can be further improved in that a groove for holding the sealing element is formed in the connecting area of the housing and/or in the sleeve-shaped part of the cable gland, the sealing element, in turn, being formed and arranged such that it does not influence the axial movability between the housing and the sleeve-shaped part of the cable gland.

Some advantageous configurations of the connection device of the invention which can be implemented both in the first alternative according to the first teaching of the invention and also in the second alternative according to the second teaching of the invention will be mentioned below.

To improve the sealing of the cable gland, it is especially provided that the second housing part is made as a seal crown on the end assigned to the cable gland or the end of the sleeve-shaped part of the cable gland assigned to the union nut. When the union nut is screwed on, the seal crown which has a plurality of axially running notches is compressed by the conically tapering end of the union nut, by which the cable is axially fixed, and thus, the plug connected to the cable is tension-relieved. Moreover, within the seal crown, there can be a cable seal by which the seal of the housing interior or cable passage is improved when the union nut is screwed on.

To mechanically protect the cable to be connected, also, it is preferably provided that the union nut is connected to a flexible anti-kink sleeve. This prevents kinking of the cable on the cable-side end of the connection device. Finally, on the housing or the first housing part, there are at least two elastic catch means for mechanical fixing of the connection device on one socket or on an electrical device.

In particular, there are a host of possibilities for embodying and developing the connection device in accordance with the invention. In this respect reference is made to the detailed description of two preferred embodiments with reference to the accompanying drawings.

DETAILED DESCRIPTION OF THE INVENTION

Figure 1:
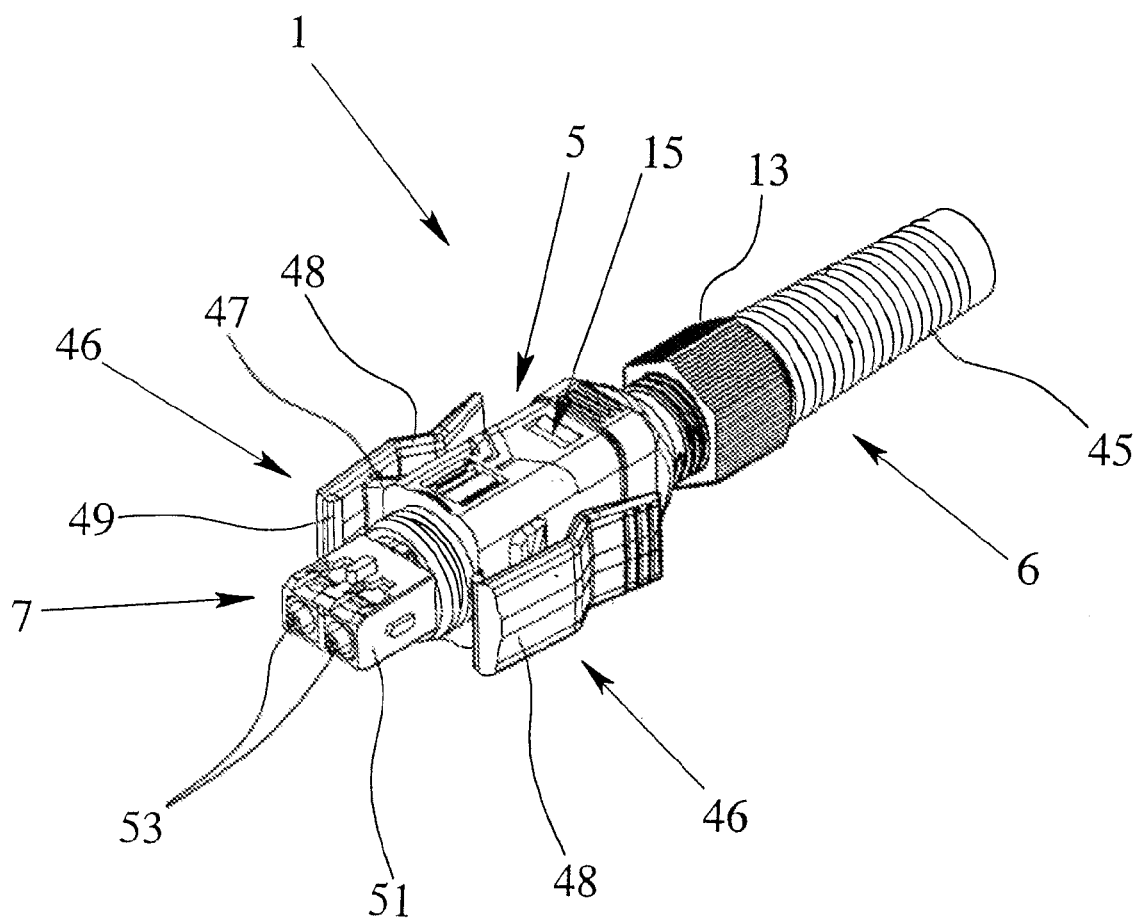
FIG. 1 is a perspective of one embodiment of the connection device according to the first teaching of the invention.
Figure 2:
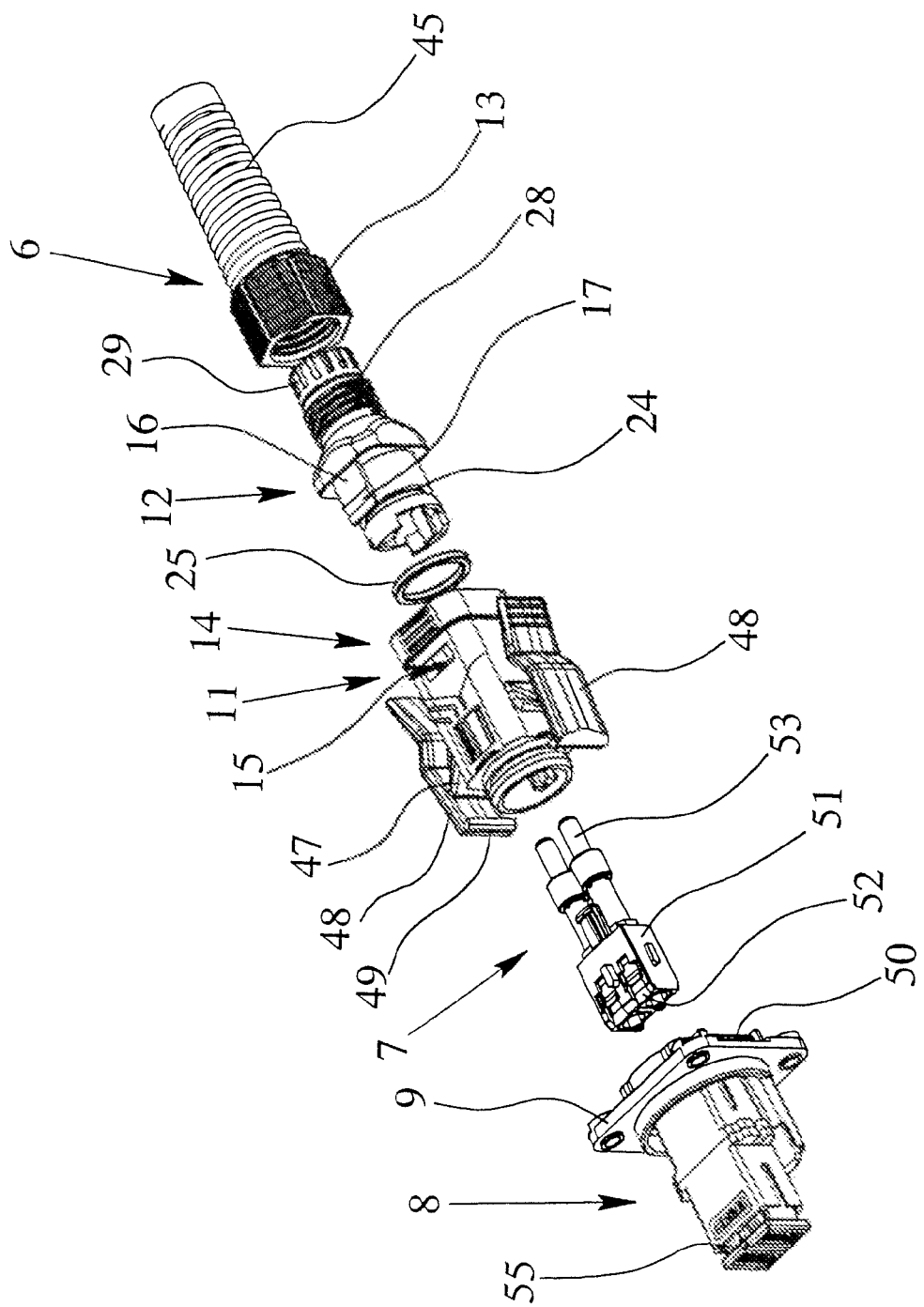
FIG. 2 is an exploded view of the connection device according to FIG. 1, FIGS. 3a & 3b are a longitudinal sectional views of the connection device of FIG. 1, with the first housing part being in the first position in FIG. 3a and in the second position in FIG. 3b, FIGS. 4a -4d are enlarged views of part of the connection device as shown in FIGS. 3a & 3b, respectively.

The figures show two different embodiments of a connection device 1 for connecting a cable. In the illustrated embodiments, the connection device 1 is designed for connecting a fiber-optic cable 2 with two optical fibers 3, 4 (see, FIGS. 4a & 4b). The connection device 1 has a housing 5, a cable gland 6 and a plug 7 for insertion into a corresponding sleeve 8 of an electrical device, the front plate 9 of which is shown in FIG. 2. For insertion or passage of the fiber-optic cable 2, the housing 5 has a cable passage 10.

The individual glass fibers or plastic fibers of the optical fibers 3, 4, before insertion of the cable 2 into the housing 5, can already be connected to the plug 7 which, for its part, is held at its rear area in the housing 5, and in this regard, is axially fixed to the housing 5. However, in addition, it is also possible for the fiber-optic cable 2 to be first pushed through the housing 5 and the cable passage 10, then, the insulation stripped and connected to the plug 7.

In the first embodiment of the connection device 1 of the invention, which is shown in FIGS. 1 to 4, the housing 5 has a first housing part 11 for holding the plug 7 and a second housing part 12 for connection to the cable gland 6 which has a union nut 13. The housing 5 is thus made in two parts, as is apparent especially from FIG. 2. In this connection, the first housing part 11 has a connecting area 14 which is made such that the first housing part 11 can be locked to the second housing part 12. However, in this connection, it is important that the locking between the first housing part 11 and the second housing part 12 is made such that axial displacement of the first housing part 11 relative to the second housing part 12 is possible, the axial displacement however being limited.

In this connection, in the connecting area 14 of the first housing part 11, a window 15 is formed which, in the mounted state of the first housing part 11 and the second housing part 12, is engaged by a projection 17 which is made on a catch arm 16 provided on the second housing part 12. The projection 17 has an entry bevel 18 and a step 19 which is directly connected to the entry bevel 18. The entry bevel 18 runs opposite the entry direction of the second housing part 12 into the first housing part 11 so that the second housing part 12 is easily inserted into the first housing part 11 by virtue of the entry bevel 18 and the elasticity of the catch arm 16 and can be locked in it. In this respect, the second housing part 12, and with it also the cable 2, are held locked by the locking of the projection 17 of the catch arm 16 in the window 15 also opposite the first housing part 11.

Figure 4A:
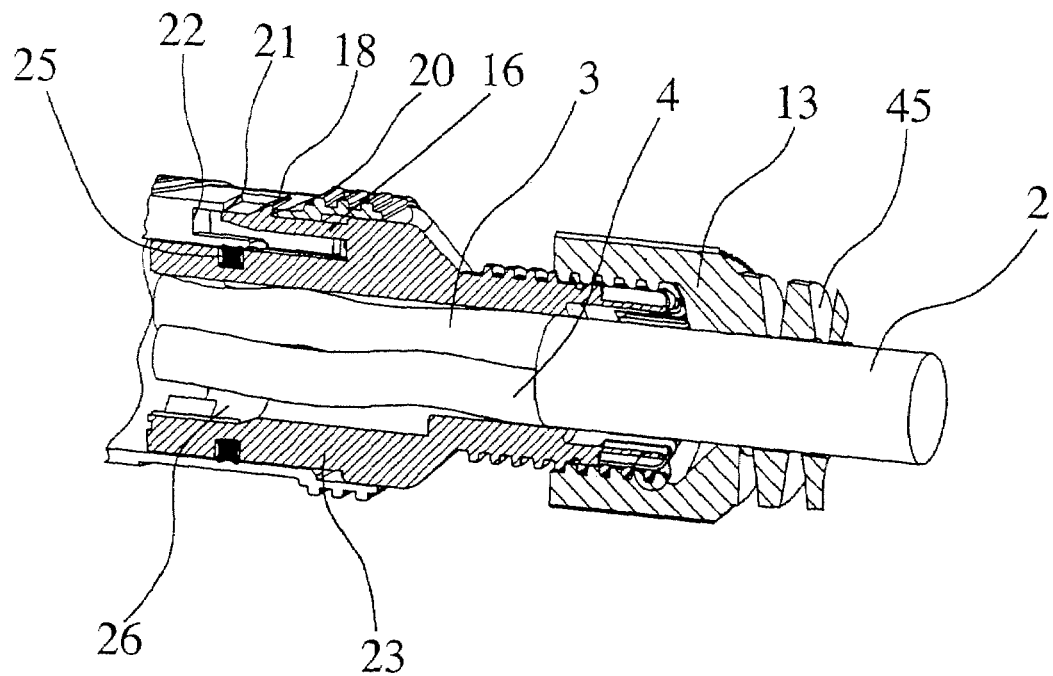
Figure 4B:
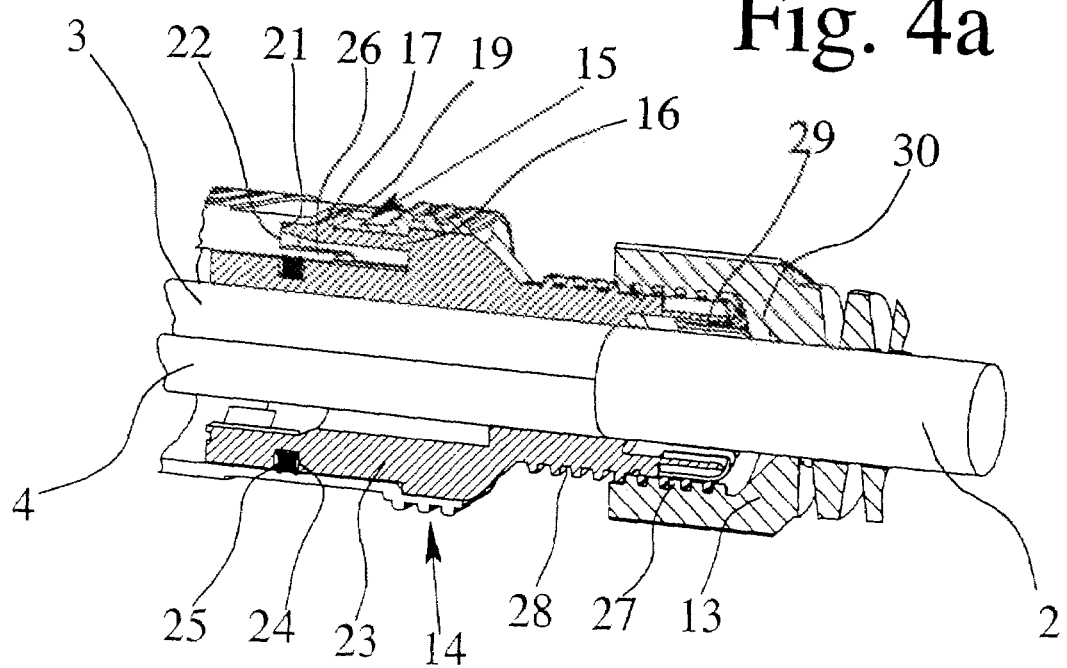
Figure 4C:
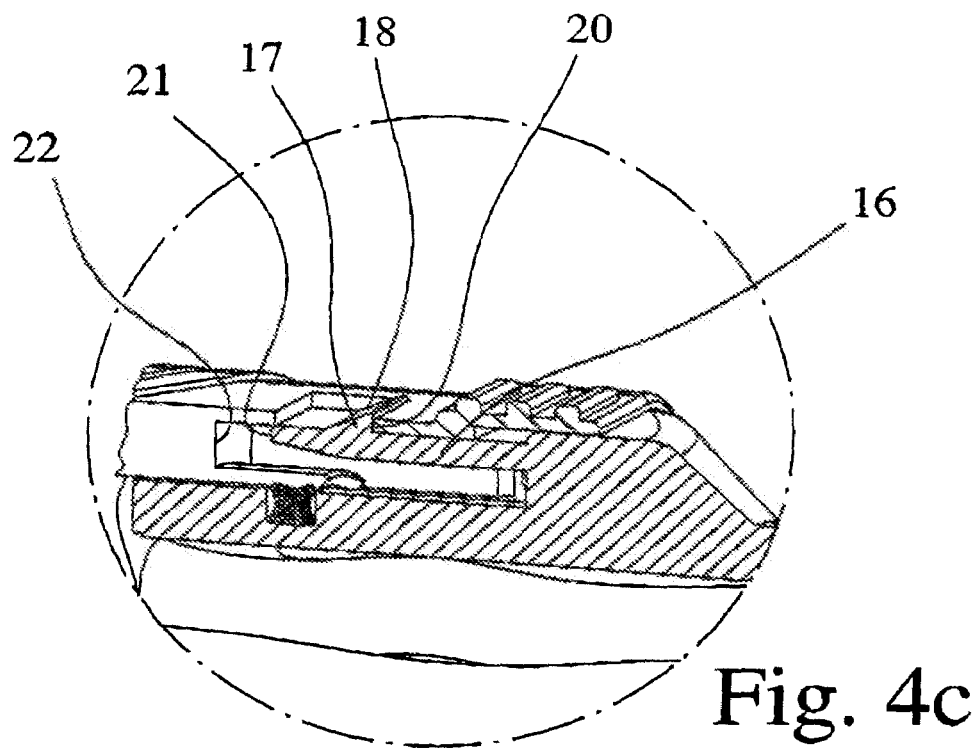
Figure 4D:
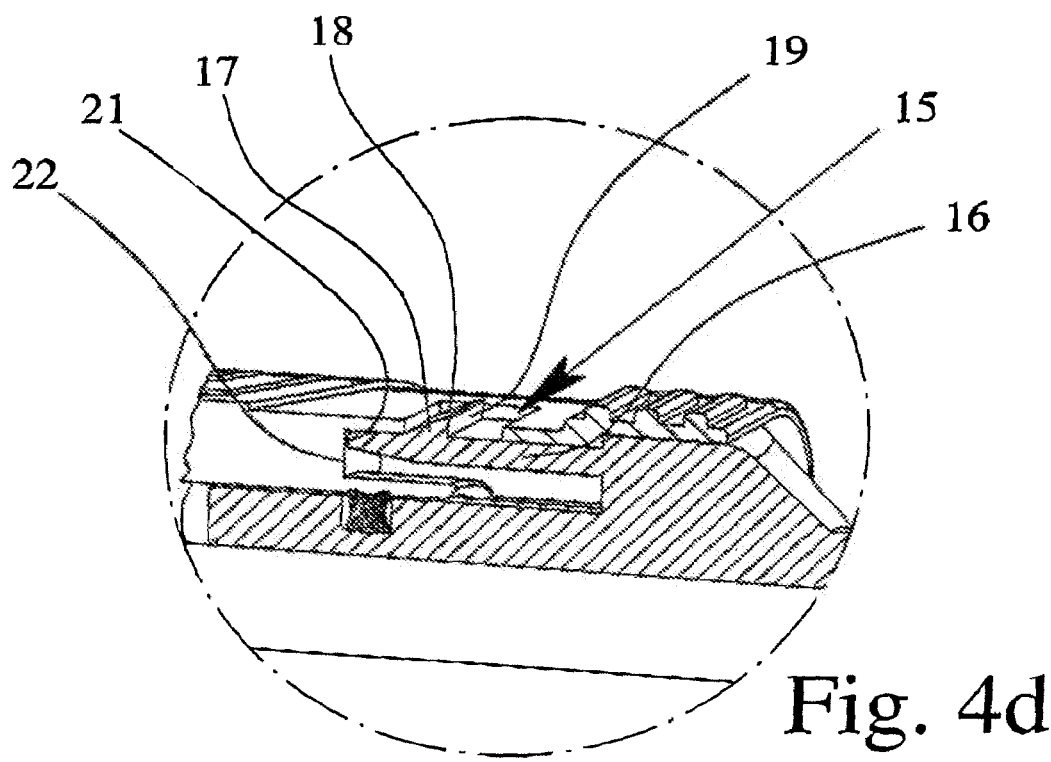

In particular, FIGS. 4a & 4b show the two end positions of the first housing part 11 relative to the second housing part 12. In the first position of the first housing part 11 shown in FIG. 4a, the first edge 20 of the window 15 adjoins the step 19 of the projection 17. In the second position of the first housing part II shown in FIG. 4b, conversely, the step 19 of the projection 17 is shifted from the edge 20 of the window 15 toward the opposite edge 21, the displacement being limited by the free end 12 of the catch arm 16 adjoining the second stop 22 which is made in the first housing part 11.

Since the second housing part 12 is connected axially tightly to the cable gland 6, and the latter, in the completely mounted state, also axially fixes the inserted fiber-optic cable 2, the axial displacement of the first housing part 11 causes not only displacement relative to the second housing part 12, but also relative to the fiber-optic cable 2 that is fixed by the cable gland 6. Moreover, since the plug 7 is also axially fixed on the first housing part 11, thus, axial displacement of the plug 7 relative to the fiber-optic cable 2 also takes place. This is especially apparent from FIGS. 3a & 3b and will be explained in detail later.

For example, it is apparent from FIG. 2 that the second housing part 12 on the side assigned to the first housing part 11 has a cylindrical extension 23 which, in the mounted state, is located within the connecting area 14 of the first housing part 11. It is apparent from FIG. 3 that the extension 23 is dimensioned such that the extension 23 extends over the area of the window 15 in the connecting area 14 of the first housing part 11 so that there is no open cutout in the housing 5 to the cable passage 10. The sealing of the cable passage 10 is, moreover, further ensured by a groove 24 for holding a sealing element 25 being formed in the extension 23 of the second housing part 12 and sealing the extension 23 against a corresponding smaller projection 26 on the first housing part 11. The sealing element 25 or the extension 26 is made such that the sealing element 25 does not prevent axial movement between the first housing part 11 and the second housing part 12.

FIGS. 2 to 4 also show that the second housing part 12 has an outside thread 28 on the end assigned to the cable gland 6 which corresponds to the inside thread 27 of the union nut 13. When the union nut 13 is screwed onto the outside thread 28 of the second housing part 12, a seal crown 29 on the end of the housing part 12 is compressed by the tapering end 30 of the union nut 13, by which the fiber-optic cable 2 is both sealed and also tension-relieved, i.e., axially fixed.

Figure 5:
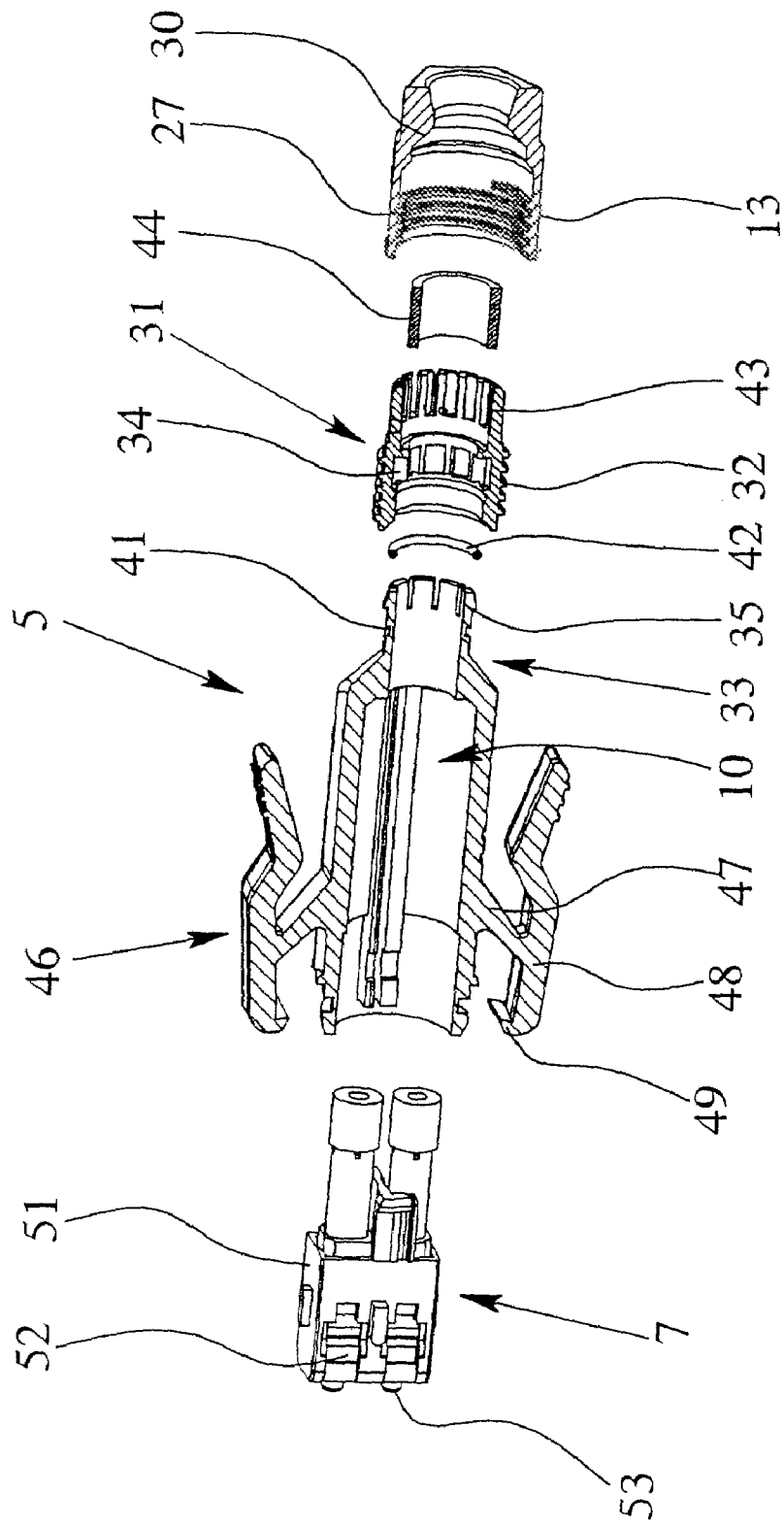
FIG. 5 is an exploded view of a connection device of the invention according to the second teaching of the invention.
Figure 6:
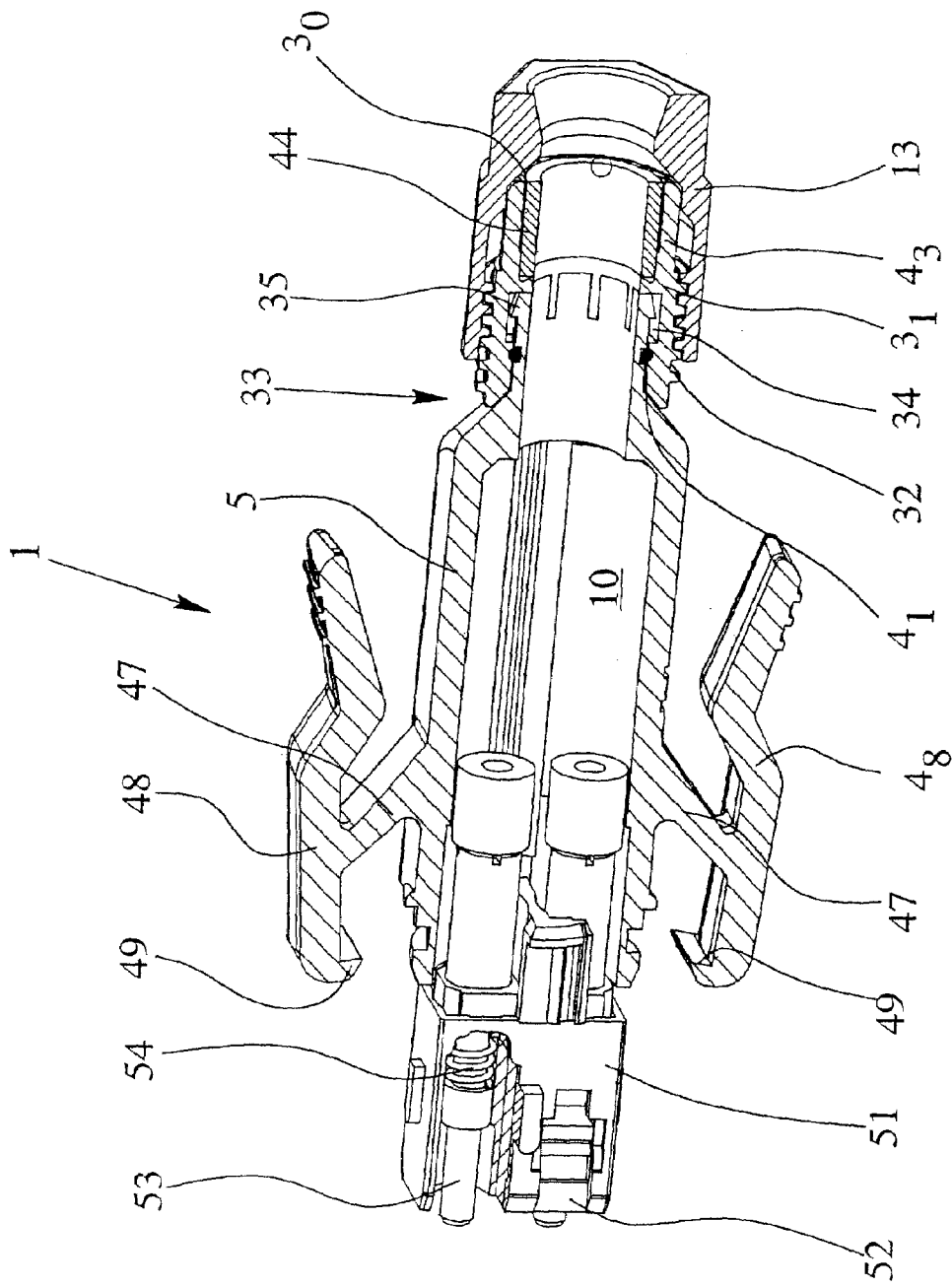
FIG. 6 is a longitudinal sectional view of the connection device of FIG. 5, FIGS. 7a & 7b are enlarged views part of the connection device according to FIG. 6, with the housing being in the first position in FIG. 7a and in the second position in FIG. 7b.

The second embodiment of the connection device 1 shown in FIGS. 5 to 7, likewise, has a housing 5, a cable gland 6 and a plug 7 for connection of the fibers of the optical fibers 3, 4 of the fiber-optic cable 2. However, in contrast to the above described embodiment, here, it is not the housing 5, but the cable gland 6 which is made in two parts. The cable gland 6, in addition to the union nut 13, has a sleeve-shaped part 31 with an outside thread 32 onto which the union nut 13 can be screwed. In terms of its external shape, the sleeve-shaped part 31 is similar to the cable-side end of the second housing part 12 as shown in FIGS. 1 to 4.

The end of the housing 5 assigned to the cable gland 6, in turn, has a connecting area 33 which is shaped differently and which is made such that the sleeve-shaped part 31 can, on the one hand, be locked to the connecting area 33, but on the other, can be moved axially to a limited degree.

For this purpose, several recesses 34 are formed in the sleeve-shaped part 31 of the cable gland 6, and several projections 35 are formed on the connecting area 33 of the housing 5 which, in the installed state of the housing 5 and the sleeve-shaped part 31 of the cable gland 6, engage the recesses 34 and can be axially moved in them by a defined extent X. The projections 35 of the connecting area 33, similarly to the projection 17 of the catch arm 16 shown in FIGS. 1 to 4, each have an entry bevel 36 and a step 37. In turn, the entry bevel 36 facilitates the pushing of the sleeve-shaped part 31 onto the connecting area 33 of the housing 5.

In particular, FIG. 5 shows that the connecting area 33 has several projections 35 that are separated from one another by axial slots and the sleeve-shaped part 31 has several recesses 34 that are separated from one another by axial bridges. This segmenting prevents radial twisting of the sleeve-shaped part 31 and the connecting area 33, and thus, of the cable gland 6 and the housing 5 in the mounted state. Thus, locking is easily implemented in this version.

Figure 7A:
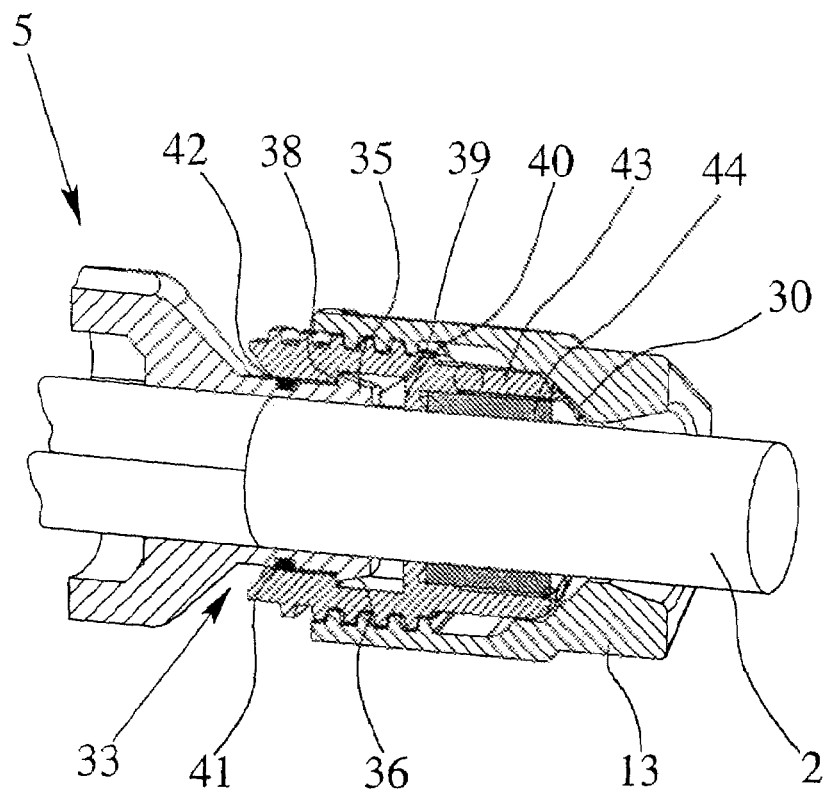
Figure 7B:
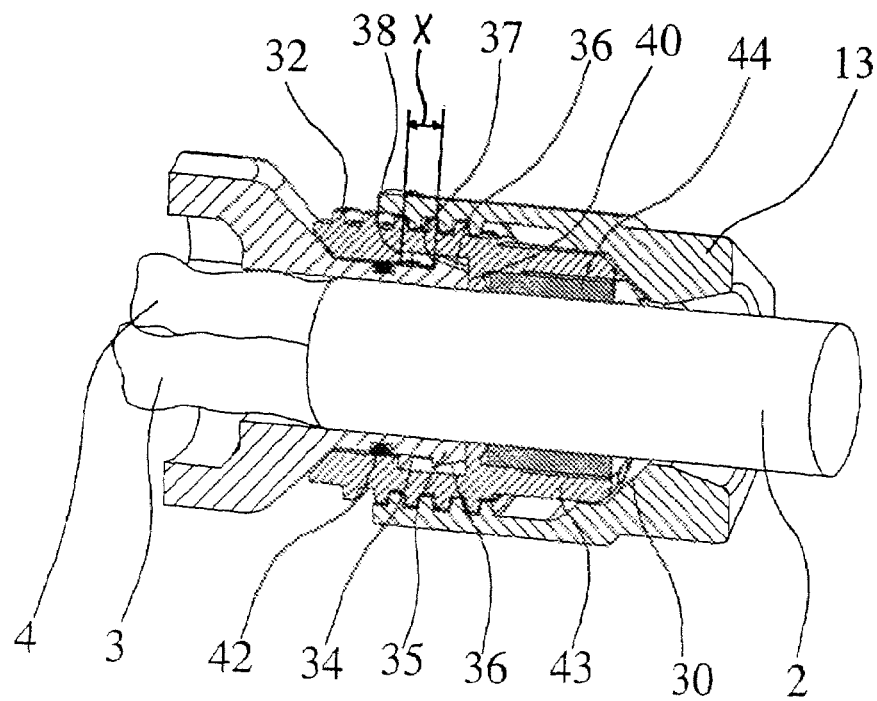

In the first position of the housing 1 which is shown in FIG. 7a, the step 37 of the projection 35 adjoins the first edge 38 of the recess 34. If the housing 5 is displaced by distance X, the front 39 of the connecting area 31, in the illustrated embodiment, the end of the projection 35, adjoins the opposite end 40 of the recess 34. The housing 5 is located in the second position shown in FIG. 7b. The dimensioning of the recess 34 and of the projection 35 fixes the maximum possible axial displacement X.

To ensure an adequate seal and tension relief, in the second embodiment, there is a groove 41 for holding a sealing element 42, the groove 41 being located in the connecting area 33 of the housing 5. Moreover, the sleeve-shaped part 31, in addition to an outside thread 32, also has a seal crown 43 within which there is additionally a cable seal 44. In the embodiment of the connection device 1 as shown in FIGS. 1 to 4, this cable seal 44 can of course also be located within the seal crown 29 which is made on the second housing part 12.

As additional mechanical protection for the fiber-optic cable 2 which is to be connected, the cable gland 6 shown in FIGS. 1 to 4 has an anti-kink sleeve 45 which is connected to the union nut 13. Also, the figures show that, on the housing 5 or on the first housing part 11, there are two elastic catch means 46, each of which has a catch arm 48 that is connected to the housing 5 via a bridge 47 and catch projections 49 located on the end of the catch arms 48 which lock into corresponding recesses 50 on the front plate 9 of the electrical device or the sleeve 8.

Since the illustrated embodiments are each a connection device I for a fiber-optic cable 2, the plug 7 is also made accordingly. Specifically, it is a SC plug which has an outer plug housing 51 with two ferrules 53 which are held in the inner housing 52. The ferrules 53, which are used to hold the fibers of the fiber-optic cable 3, 4, are supported to be able to move axially via a spring 54 (see, FIG. 6) into the inner housing 52. In addition, the inner housing 52 is located able to move axially relative to the plug housing 51. To ensure reliable and exact positioning of the ferrules 53 in the sleeve 8, the inner housing 52 of the plug 7 can be locked into the corresponding inner housing 55 of the socket 8.

Figure 3A:
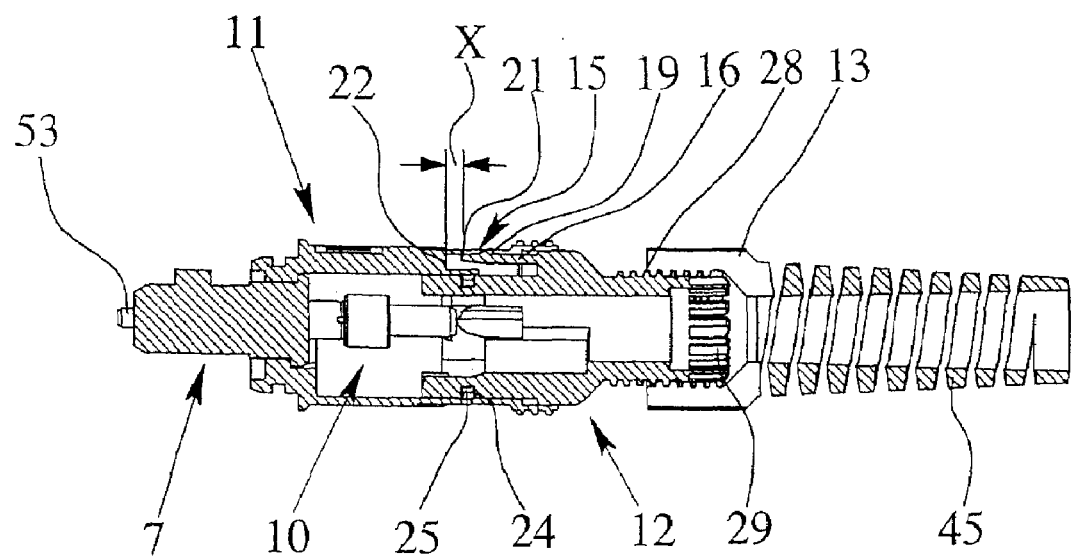
Figure 3B:
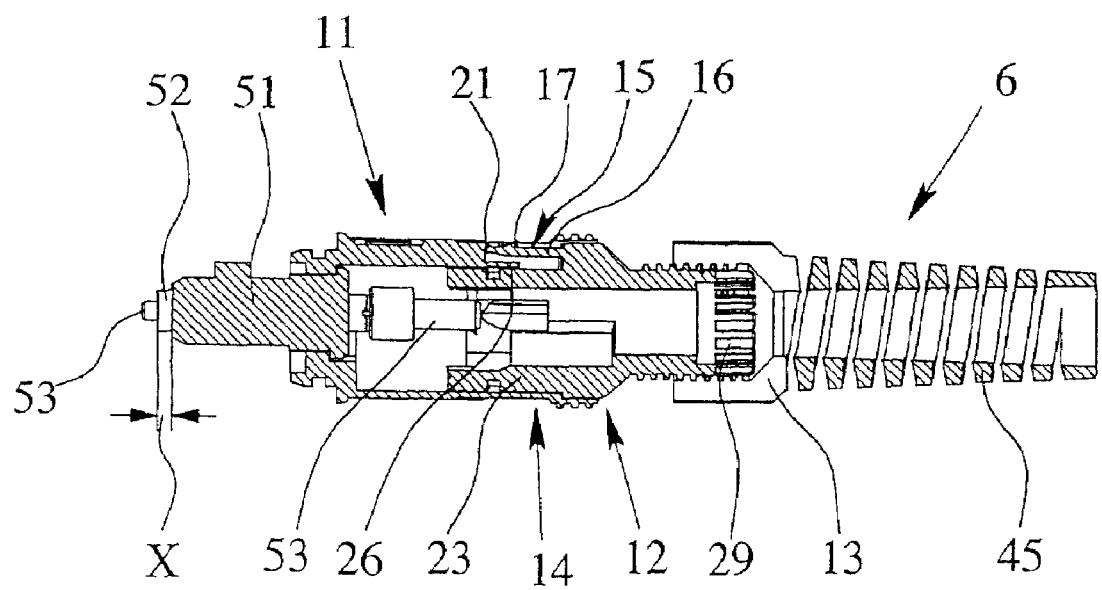

To unlock these known SC plugs, it is now necessary for the plug housing 51 to be pulled back axially relative to the inner housing 52 by roughly 1 to 2 mm. This can take place in the connection device 1 of the invention in that the housing 5, which is axially rigidly connected to the plug housing 51 or the first housing part 11, is pulled back so that the plug housing 51 moves axially relative to the inner housings 52, as is indicated in FIG. 3b. At the same time, however, the given axial movement between the first housing part 11 and the second housing part 12 and between the housing 5 and the sleeve-shaped part 31 prevents unwanted compression of the fiber-optic cable 2 which leads to damage since the axial displacement of the first housing part 11 and of the housing 5 does not lead to axial displacement of the ferrules 53 or the optical fibers 3, 4 connected to the ferrules 53 relative to the cable gland 6.

Figure 8:
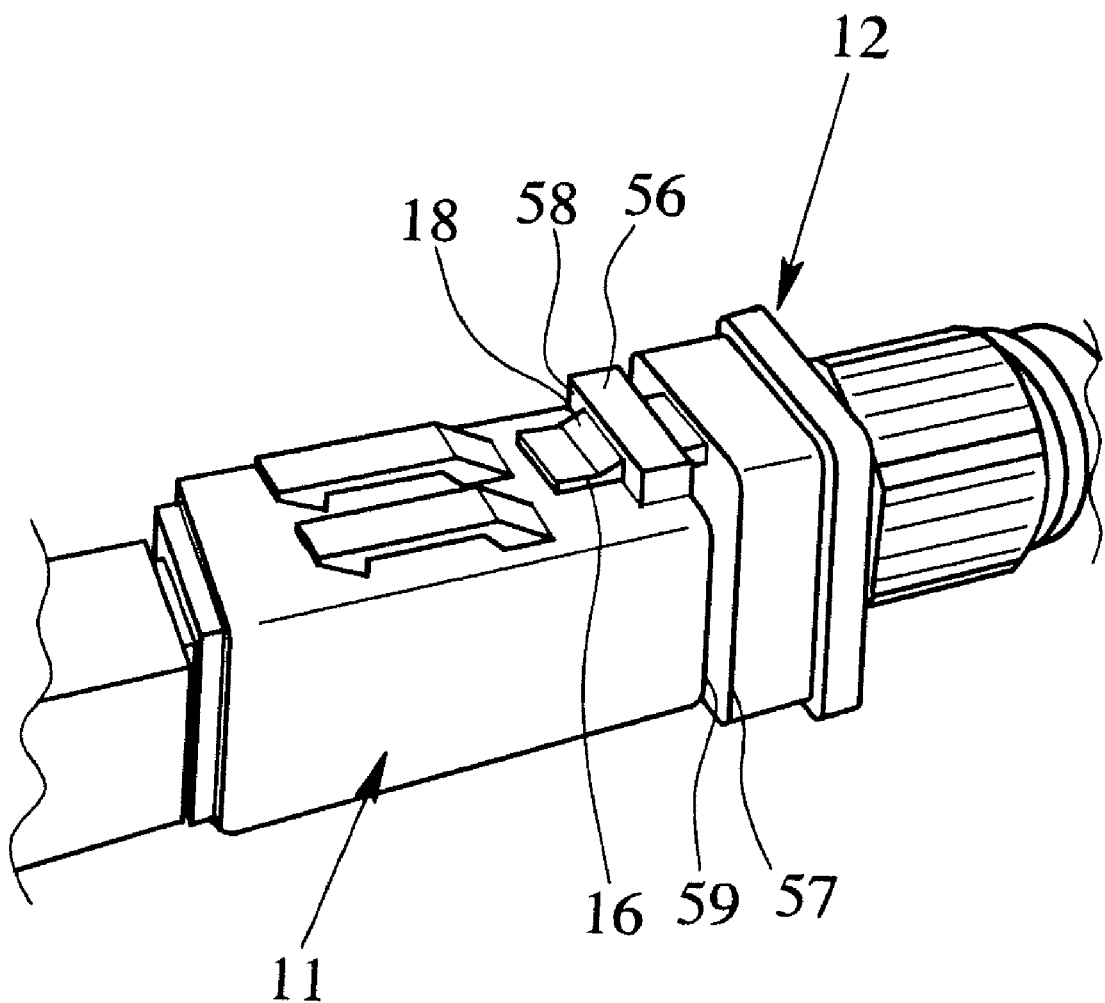
FIG. 8 shows an alternative configuration in the connecting area of the first housing part.

FIG. 8 shows an alternative configuration in which, in the connecting area 14 of the first housing part 11, instead of a window 15, a saddle 56 is formed through which the catch arm 16 of the second housing part 12 extends in the mounted state of the two housing parts. Here, the catch arm 16, as described above, has a projection 17 with an entry bevel 18 and a step 19, at this point, a second stop 57 being formed for bilateral limitation of the axial mobility on the second housing part 12. In the first position of the first housing part 11, then, the edge 58 of the saddle 56 facing away from the second housing part 12 adjoins the step 19 of the projection 17, while in the second position of the first housing part 11, the front 59 of the first housing part 11 facing the second housing part 12 adjoins the second stop 57. In this embodiment, the maximum possible axial displacement path is determined by the length of the catch arm and especially by the distance between the step 19 of the projection 17 and the second stop 57 and by the position and width of the saddle 56.

What is claimed is:

1. Connection device for connecting a cable having fibers or cores to an electrical device, comprising:

a housing, the housing having a cable passage for insertion or passage of the cable, a cable gland which has a union nut, and a plug for insertion into a corresponding socket of the electrical device, the plug being held at least partially in the housing and being connectable to fibers or cores of the cable when the cable is inserted into the cable passage, wherein the housing is formed of a first housing part for holding the plug and a second housing part for connection to the cable gland, wherein an end of the first housing part has a connecting area which is connectable to the second housing part in a manner enabling axial movement of the first housing part relative to the second housing part in a connected state thereof, wherein at least one stop is provided on the second housing part and at least one opposing stop is formed on the first housing part by which the extent of said axial movement is defined, and wherein at least two elastic catch means for mechanical fixing of the connection device on the electrical device are provided on the first housing part.

2. Connection device as claimed in claim 1, wherein the cable gland has an anti-kink sleeve connected to the union nut.

3. Connection device for connecting a cable, having fibers or cores, to an electrical device, comprising:

a housing, having a cable passage for insertion or passage of the cable, a cable gland, a plug for insertion into a corresponding socket of the electrical device, the plug being held at least partially in the housing and being connectable to the fibers or cores of the cable when the cable is inserted into the cable passage, wherein the cable gland has a sleeve-shaped part with an outer thread and a union nut with a corresponding inside thread which can be screwed onto the sleeve-shaped part, wherein an end of the housing has a connecting area which is connectable to the sleeve-shaped part of the cable gland, and the housing and the sleeve-shaped part being axially movable relative to one another in a connected state thereof, wherein at least one stop is provided on the sleeve-shaped part of the cable gland and wherein at least one opposing stop is formed on the connecting area of the housing by which the extent to which the housing and the sleeve-shaped part are axially movable relative to one another is defined.

4. Connection device as claimed in claim 3, wherein at least one recess is formed in the sleeve-shaped part of the cable gland and wherein at least one projection is formed on the connecting area of the housing, the projection engaging the recess in the connected state of the housing and the sleeve-shaped part of the cable gland so that the housing can be axially moved by said defined extent.

5. Connection device as claimed in claim 4, wherein the projection on the connecting area of the housing has an entry bevel and a step, and wherein the step of the projection adjoins a first edge of the recess in a first position of the housing and wherein a front of the connecting area adjoins an opposing edge of the recess in an axially shifted second position of the housing.

6. Connection device as claimed in claim 3, wherein a groove is formed in at least one of the connecting area of the housing and the sleeve-shaped part of the cable gland for holding a sealing element, and wherein the sealing element is formed and arranged in a manner enabling axial displacement between the housing part and the sleeve-shaped part of the cable gland.

7. Connection device as claimed in claim 3, wherein an end of the sleeve-shaped part of the cable gland which is connectable with the union nut comprises a seal crown and has a cable seal located in it.

8. Connection device as claimed in claim 3, wherein the cable gland has an anti-kink sleeve connected to the union nut.

9. Connection device as claimed in claim 3, wherein at least two elastic catch means for mechanical fixing of the connection device on the electrical device are provided on the housing.

10. Connection device as claimed in claim 3, wherein the cable is a fiber-optic cable, wherein the plug has an outer plug housing with at least one ferrule held in an inner housing, the inner housing being axially movable relative to the plug housing and being lockable in a corresponding socket inner housing, the plug housing being axially rigidly connectable to the housing and the ferrule being connectable to the optical fiber of the cable.

11. Connection device as claimed in claim 10, wherein the plug is a SC plug.

12. Connection device for connecting a cable having fibers or cores to an electrical device, comprising:

a housing, the housing having a cable passage for insertion or passage of the cable, a cable gland which has a union nut, and a plug for insertion into a corresponding socket of the electrical device, the plug being held at least partially in the housing and being connectable to fibers or cores of the cable when the cable is inserted into the cable passage, wherein the housing is formed of a first housing part for holding the plug and a second housing part for connection to the cable gland, wherein an end of the first housing part has a connecting area which is connectable to the second housing part in a manner enabling axial movement of the first housing part relative to the second housing part in a connected state thereof, wherein at least one stop is provided on the second housing part and at least one opposing stop is formed on the first housing part by which the extent of said axial movement is defined, and wherein the cable gland has an anti-kink sleeve connected to the union nut.

* * * * *